US009616430B2

(12) United States Patent
Isaksson et al.

(10) Patent No.: US 9,616,430 B2
(45) Date of Patent: Apr. 11, 2017

(54) CENTRIFUGAL SEPARATOR AND ROTOR HAVING AN EXTERNAL HUB TO SHAFT CONNECTION

(75) Inventors: Roland Isaksson, Grödinge (SE); Peter Thorwid, Sundbyberg (SE)

(73) Assignee: Alfa Laval Corporate AB, Lund (SE)

(*) Notice: Subject to any disclaimer, the term of this patent is extended or adjusted under 35 U.S.C. 154(b) by 1056 days.

(21) Appl. No.: 13/637,600

(22) PCT Filed: Mar. 29, 2011

(86) PCT No.: PCT/SE2011/050348
§ 371 (c)(1),
(2), (4) Date: Dec. 4, 2012

(87) PCT Pub. No.: WO2011/123032
PCT Pub. Date: Oct. 6, 2011

(65) Prior Publication Data

US 2013/0095993 A1 Apr. 18, 2013

(30) Foreign Application Priority Data

Mar. 31, 2010 (SE) ...................................... 1050309

(51) Int. Cl.
*B04B 1/14* (2006.01)
*B04B 9/08* (2006.01)
(Continued)

(52) U.S. Cl.
CPC .................. *B04B 7/08* (2013.01); *B04B 1/08* (2013.01); *B04B 1/14* (2013.01); *B04B 9/08* (2013.01); *B04B 2009/085* (2013.01)

(58) Field of Classification Search
CPC .... B04B 1/08; B04B 1/14; B04B 9/08; B04B 7/08; B04B 2009/085
(Continued)

(56) References Cited

U.S. PATENT DOCUMENTS 2,668,658 A 2/1954 Peltzer, Sr.
3,073,516 A 1/1963 Glasson
(Continued)

FOREIGN PATENT DOCUMENTS

DE 3409068 A1 9/1985
DE 19835120 C1 10/1999
(Continued)

*Primary Examiner* — Charles Cooley
*Assistant Examiner* — Shuyi S Liu
(74) *Attorney, Agent, or Firm* — MKG, LLC

(57) ABSTRACT

The invention relates to a centrifugal separator for separation of at least two components of a fluid mixture which have different densities. The centrifugal separator comprises a rotor arranged for rotation about a vertical axis of rotation (R) and having a rotor wall which surrounds a separating chamber within the rotor, with an inlet adapted to feeding the fluid mixture into the rotor's separating chamber, and at least one outlet adapted to discharging outwardly from the rotor a component separated from the fluid mixture. A rotor shaft supports the rotor and is drivably connected to a motor (M) for rotation of the rotor about the axis of rotation (R). A hub is provided outside the rotor, and the hub and the rotor shaft are arranged to be connected together from the outside of the rotor by means of a lockable and releasable fastening which is configured to lock the rotor shaft relative to the hub in both a torque-transmitting and an axial force-transmitting way.

11 Claims, 3 Drawing Sheets

(51) Int. Cl.

| | |
|---|---|
| ***B01B 1/08*** | (2006.01) |
| ***B04B 7/08*** | (2006.01) |
| ***B04B 1/08*** | (2006.01) |

(58) Field of Classification Search

USPC ............................ 494/40, 43, 48, 64, 65, 67

See application file for complete search history.

(56) References Cited

U.S. PATENT DOCUMENTS

| | | | | | |
|---|---|---|---|---|---|
| 3,519,200 | A | | 7/1970 | Nilson | |
| 3,967,778 | A | | 7/1976 | Hunwick | |
| 4,093,052 | A | | 6/1978 | Falk | |
| 4,191,325 | A | | 3/1980 | Lindfors et al. | |
| 4,193,538 | A | * | 3/1980 | Schwarz | B04B 5/0414 422/72 |
| 4,724,076 | A | | 2/1988 | Deguchi et al. | |
| 5,582,724 | A | * | 12/1996 | Rogers | B01D 17/0217 210/221.2 |
| 5,792,037 | A | | 8/1998 | Bodelson et al. | |
| 6,024,687 | A | | 2/2000 | Cheng | |
| 6,224,531 | B1 | | 5/2001 | Frehland | |
| 6,428,460 | B1 | | 8/2002 | Appelquist et al. | |
| 2002/0016245 | A1 | | 2/2002 | Zettier | |
| 2005/0201825 | A1 | * | 9/2005 | Zingeler | F16D 1/094 403/367 |
| 2010/0204032 | A1 | | 8/2010 | Pregenzer et al. | |

FOREIGN PATENT DOCUMENTS

| | | | | | |
|---|---|---|---|---|---|
| EP | 0208485 | A1 | | 1/1987 | |
| FR | 810148 | | | 3/1937 | |
| GB | 409196 | | | 4/1934 | |
| GB | 476823 | | | 12/1937 | |
| JP | S32-11386 | | | 9/1957 | |
| JP | 62-27751 | U | | 2/1987 | |
| JP | H10-504244 | A | | 4/1998 | |
| JP | 2009-82922 | A | | 4/2009 | |
| SE | 76984 | C1 | | 6/1930 | |
| SE | 512052 | C2 | | 1/2000 | |
| SE | 512770 | C2 | | 5/2000 | |
| SE | 530223 | C2 | | 4/2008 | |
| SU | 971488 | | | 11/1982 | |
| WO | 9533543 | A1 | | 12/1995 | |
| WO | 96-41683 | A1 | | 12/1996 | |
| WO | 9641683 | A1 | | 12/1996 | |
| WO | WO 9641683 | A1 | * | 12/1996 | B04B 1/14 |
| WO | 2007133161 | A1 | | 11/2007 | |
| WO | 2008111889 | A1 | | 9/2008 | |
| WO | 2009015853 | A1 | | 2/2009 | |
| WO | WO 2009015853 | A1 | * | 2/2009 | A61C 17/046 |

* cited by examiner

CENTRIFUGAL SEPARATOR AND ROTOR HAVING AN EXTERNAL HUB TO SHAFT CONNECTION

TECHNICAL FIELD

The invention relates to a centrifugal separator for separation of two or more components of a fluid mixture which are of different densities. The centrifugal separator comprises a rotor which is rotatable about an axis of rotation. The rotor comprises a rotor wall which surrounds an inner space with a separating chamber within the rotor, with an inlet adapted to feeding the fluid mixture into the rotor's separating chamber and at least one outlet adapted to discharging out from the rotor a component separated from the fluid mixture. A rotor shaft is arranged to be connected to a hub on the rotor wall, and the rotor is supported via the rotor shaft which is drivably connected to a motor for rotation of the rotor about the axis of rotation. The invention relates also to the actual rotor for the aforesaid centrifugal separator.

BACKGROUND OF THE INVENTION

Certain types of centrifugal separators have a rotor that is situated on an uppermost portion on a vertical rotor shaft and comprises a hub connected to the rotor shaft. Typically, the hub has a connection which is configured for the rotor shaft and which is conical and extends axially inwards in the rotor's inner space, and a portion of the rotor shaft which is inserted in the rotor's hub has a corresponding conical shape and likewise extends inwards in the rotor. The conical shape results in self-locking of the hub and the rotor shaft during rotation, thereby achieving during operation a transfer of torque between the rotor shaft and the rotor. The conical shape also results in self-centering of the rotor on the rotor shaft. Within the rotor, a nut is provided on the end of the rotor shaft to lock the rotor axially to the rotor shaft. The nut thus provides protection against (axial) forces which may act upon the rotor during operation. Removing the rotor from the rotor shaft involves first dismantling the rotor's constituent parts in order thereby to open up its interior so that the nut can be removed. Such dismantling is relatively time-consuming.

Other types of centrifugal separators have a connection between the rotor shaft and the hub similar to that described above. Consequently, this hub likewise has a conical connection which extends axially inwards in the rotor's inner space, and the portion of the rotor shaft which is inserted in the hub has a corresponding conical shape and likewise extends inwards in the rotor. These centrifugal separators comprise a duct extending axially within the rotor shaft and serving as an inlet for the liquid fluid mixture which is to be separated in the rotor. The duct leads into a so-called distributor through which the liquid mixture is supplied to the separating chamber. During operation, the configuration of the inlet with the duct and the distributor causes the liquid mixture to follow a transfer path in which there are two relatively large changes of direction of flow (about 155° each). The first change of direction is at the transition between the duct and the distributor and the second change of direction is at the transition from the distributor upwards to the separating chamber. Such large changes of direction cause the liquid mixture fed to the separating chamber to be subject to undesirable flow resistance and pressure drop.

SUMMARY OF THE INVENTION

An object of the present invention is to propose a centrifugal separator which allows simplified handling of a rotor and which at the same time has advantageous characteristics.

This object is achieved by a centrifugal separator which has a hub is situated outside the rotor's inner space and has, for the rotor shaft, a connection directed axially outward from the rotor, and a fastener is so arranged at the side of the rotor wall which faces away from the inner space as to be operable from outside the rotor in order to releasably connect the hub to the rotor shaft.

The invention makes it possible for the rotor to be released from the outside, with consequently no need for the rotor to be dismantled in order to be removed from the rotor shaft. Accordingly, the whole rotor can be removed after releasing the fastener from the outside of the rotor. The invention thus makes it possible to handle the complete rotor. This means that a simple change of rotor can be effected by a complete new assembled rotor being fitted on and locked to the rotor shaft by means of the fastener which is releasable from outside the rotor.

The present invention also affords other advantages. According to the invention, the hub is situated outside the rotor's inner space and has for the rotor shaft a connection directed axially outwards from the rotor. This means that the hub has no axial extent inwards in the rotor's inner space. As the rotor shaft and the hub do not penetrate the inner space or occupy any space within the rotor, the resulting void in the inner space can be used for other purposes. Such a void in the inner space may for example be used to provide liquid passages to and from the centrifugal separator in a more advantageous way (with regard to flow). A more detailed description of such liquid passages appears below. The void in the inner space may also accommodate measuring instruments for measuring various parameters within the rotor during operation. This void is situated centrally within the rotor and is therefore not subject to any major centrifugal forces. The measuring instruments are therefore protected from excessive centrifugal forces which might otherwise damage them.

According to an embodiment of the invention, the hub is tubular, extends axially outwards from the rotor wall and is configured to radially surround a portion of the rotor shaft, and the fastener is arranged to connect the hub to said portion of the rotor shaft. The tubular hub facilitates the fitting and alignment of the rotor on the rotor shaft. The tubular hub also results in a relatively elongate axial connection for the rotor shaft, making it possible to ensure good connection.

According to an alternative embodiment of the invention to the embodiment described above, the hub takes the form of a recess in the rotor wall and is configured to radially surround a portion of the rotor shaft, and the fastener is arranged to connect the hub to said portion of the rotor shaft. In one embodiment, such a recess is provided in a relatively thick rotor wall. In one embodiment, the recess in the rotor wall is thus made deep enough to serve as a connection for the rotor shaft, with no need for the hub to extend axially inwards in the rotor's inner space. In one embodiment, the fastener therefore takes the form of a frictional fastening fitted in an annular space which is arranged radially between the hub and the rotor shaft.

According to a further embodiment of the invention, both the rotor shaft and the hub are cylindrical. A cylindrical rotor shaft and a cylindrical connection are relatively easy and inexpensive to make as compared with the previously described conical shape. A cylindrical rotor shaft and a cylindrical connection are also suited to releasable fastenings, e.g. a frictional fastening in the form of a clamping sleeve or a threaded connection.

According to another embodiment of the invention, the rotor shaft has running through it at least one axial duct adapted to have fluid flowing through it during operation of the centrifugal separator, and the hub comprises for said duct a duct connection which is arranged to communicate with the separating chamber via at least one fluid passage provided in the rotor. The duct(s) are, for example, used to feed in the fluid mixture which is to be separated and/or to discharge a separated component. Such inlets and outlets are configured as hermetic inlets and outlets for the separating chamber. This means that the fluid transfer can take place without air admixture/air contact and in a way which requires relatively little energy. In one embodiment, the duct is also used to convey, for example, a hydraulic liquid used for operating a conventional system for intermittent discharge of the separating chamber (discharge of sludge).

According to another embodiment of the invention, said duct together with the duct connection and the fluid passage to the separating chamber form for the fluid a transfer path so configured that fluid conveyed does not change direction by more than 100° relative to the axis of rotation. The present invention allows such a configuration of the transfer path, since the rotor shaft and the hub do not extend axially inwards in the rotor's inner space or occupy any space therein. This means that the direction of the liquid fluid mixture need not change as much as in the prior art centrifugal separators. Instead, the hub may be provided with a duct connection which changes the direction of the flow from the duct by 90° to a liquid passage adapted to leading the flow straight outwards in a radial direction to the separating chamber. This results in favourable flow relationships (lower flow resistance and pressure drop), since the fluid mixture fed in need not undergo as much change of direction.

According to a further embodiment of the invention, the hub comprises an axial stop for the rotor shaft, in the form of an abutment surface with a radial extent, arranged to abut against the rotor shaft's free end within the hub. This provides assurance that the hub assumes a correct axial position relative to the rotor shaft. Alternatively, the rotor shaft is provided with such an axial stop in the form of a flange or the like directed radially outwards and arranged to abut against a portion of the hub or the rotor wall.

According to another embodiment of the invention, the fastener is a clamping device arranged to connect the hub to the rotor shaft in a releasable frictional fastening. According to an embodiment, this clamping device is fitted in an annular space arranged radially between the hub and the rotor shaft and effects frictional engagement between the hub's connection and the rotor shaft. To this end, the clamping device is, for example, an outer sleeve expandable radially outwards and configured for frictional engagement with the hub, an inner sleeve expandable radially inwards and configured for frictional engagement with the rotor shaft, an annular gap extending axially between the outer sleeve and the inner sleeve, and means for pressurising a pressure medium in the gap in order to expand the outer sleeve and the inner sleeve to a locking state for the hub and the rotor shaft. Such a clamping device effects rapid and secure connection of the rotor shaft and the hub.

According to another embodiment of the invention, the hub comprises an axial stop for the clamping device in the form of an abutment surface with a radial extent configured to abut against an end of the clamping device which is within the hub. This provides assurance of correct axial positioning of the clamping device relative to the hub.

According to a further embodiment of the invention, the separating chamber contains a stack of truncated conical separating discs, the hub is situated on an underside of the rotor, and the rotor shaft is oriented vertically and supports uppermost the rotor. Such separators with separating discs are extremely effective for separation of fluid mixtures in liquid form and particles suspended therein. A complete rotor is lifted onto the rotor shaft and connected to it by the fastening.

According to another embodiment of the centrifugal separator, the rotor comprises outlet apertures peripherally in the rotor wall for discharge of a separated component in the form of sludge from the separating chamber, and an elastic sliding element is provided within the rotor to open and close said outlet apertures, which sliding element has a radially inner edge connected to, and axially fixed relative to, the rotor, and a radially outer edge portion which is axially movable relative to the rotor between outlet aperture open and closed states by elastic deformation of the sliding element. Such an elastic sliding element is particularly appropriate to the present invention, since the elastic element needs no axial support within the rotor. In the case of a conventional sliding element (which is not elastically configured), the hub which extends axially inwards in the rotor's inner space is used to support the sliding element, which is intended to move axially upwards/downwards on the hub during closure/opening of the outlet apertures. In the present invention, however, the hub does not extend axially inwards in the rotor's inner space and therefore provides no axial support for the sliding element. Hence, the use of the elastic sliding element, since it doesn't need the axial support.

According to a further embodiment, the hub, for example, takes the form of a shaft journal extending axially outwards from the rotor wall. The shaft journal and the rotor shaft are then connected together via a fastening which in this case takes the form of a shaft coupling. This makes it possible for the centrifugal separator to be so arranged that the shaft journal is provided with a first bearing member (e.g. a so-called top bearing for the rotor) mounted on the journal, while the rotor shaft is journalled by another bearing member (e.g. a so-called bottom bearing for the rotor) in a frame. This means that the whole rotor, including the shaft journal with the first bearing member mounted on it, can be fitted in the frame with said rotor shaft and the second bearing member. The shaft journal and the rotor shaft are thereafter aligned and connected together by the shaft coupling which is thus situated between the first bearing member and the second bearing member.

The invention relates also to a rotor for the aforesaid centrifugal separator. Consequently, the rotor comprises a rotor wall which surrounds an inner space with a separating chamber within the rotor and which comprises a hub arranged to be connected to a rotor shaft which is drivably connected to a motor for rotation of the rotor. The rotor is characterised in that the hub is situated outside the rotor's inner space and has for the rotor shaft a connection directed axially outwards from the rotor, and the hub is arranged to be connected by a fastening which is so disposed at the side of the rotor wall which faces away from the inner space as to be operable from the outside of the rotor in order to releasably connect the hub to the rotor shaft.

BRIEF DESCRIPTION OF THE DRAWINGS

The invention is explained below in more detail by a description of embodiments cited as examples with reference to the attached drawings.

DETAILED DESCRIPTION

Figure 1:
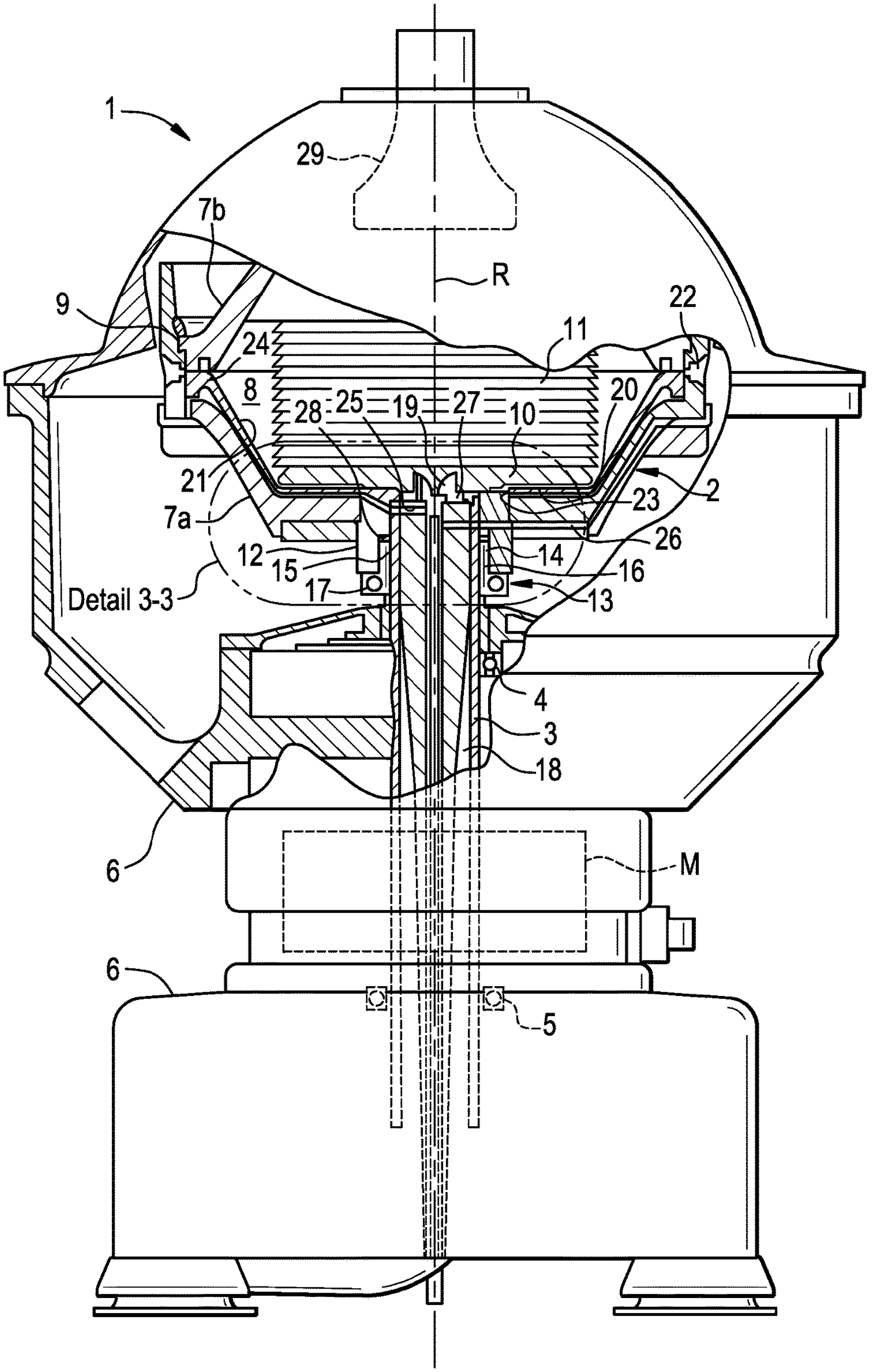
FIG. 1 shows a centrifugal separator according to a first embodiment of the invention.

FIG. 1 shows a centrifugal separator 1 according to a first embodiment of the invention. The centrifugal separator 1 comprises a rotor 2 situated uppermost on a vertical rotor shaft 3. The rotor shaft 3 is journalled by an upper bearing (a so-called top bearing 4) and a lower bearing (a so-called bottom bearing 5) in a frame 6. The rotor shaft 3 is thus arranged to support the rotor 2 for rotation about a vertical axis of rotation R in the frame 6. A motor M is adapted to driving the rotor 2 about the axis of rotation R. The rotor 2 has a rotor wall 7*a*, 7*b* which surrounds an inner space with a separating chamber 8 in which the main centrifugal separation takes place. The inner space also comprises other spaces within the rotor, e.g. inlet passages for the mixture which is to be separated in the separation space 8, and at least one outlet chamber for a separated component. The rotor wall is divided into a lower part 7*a* and an upper part 7*b* which are held together by a locking ring 9. The lower part 7*a* includes a planar wall portion 7*e* positioned on a bottom portion of the rotor 2. A compressible unit 10 comprising a stack of truncated conical separating discs 11 is situated in the inner space, centrally within the rotor. A more detailed description of the compressible unit 10 appears in specification WO 2008/111889 A1. The stack of separating discs 11 is situated in the separating chamber 8 and arranged to form between mutually adjacent separating discs thin intermediate spaces in which the main separation takes place during operation of the centrifugal separator. FIG. 1 shows schematically a small number of separating discs 11 with relatively large intermediate spaces between them. In practice, however, a large number of separating discs are stacked on one another, and the surfaces of the separating discs are provided with spacing elements to maintain the thin intermediate spaces between mutually adjacent separating discs.

Figure 3:
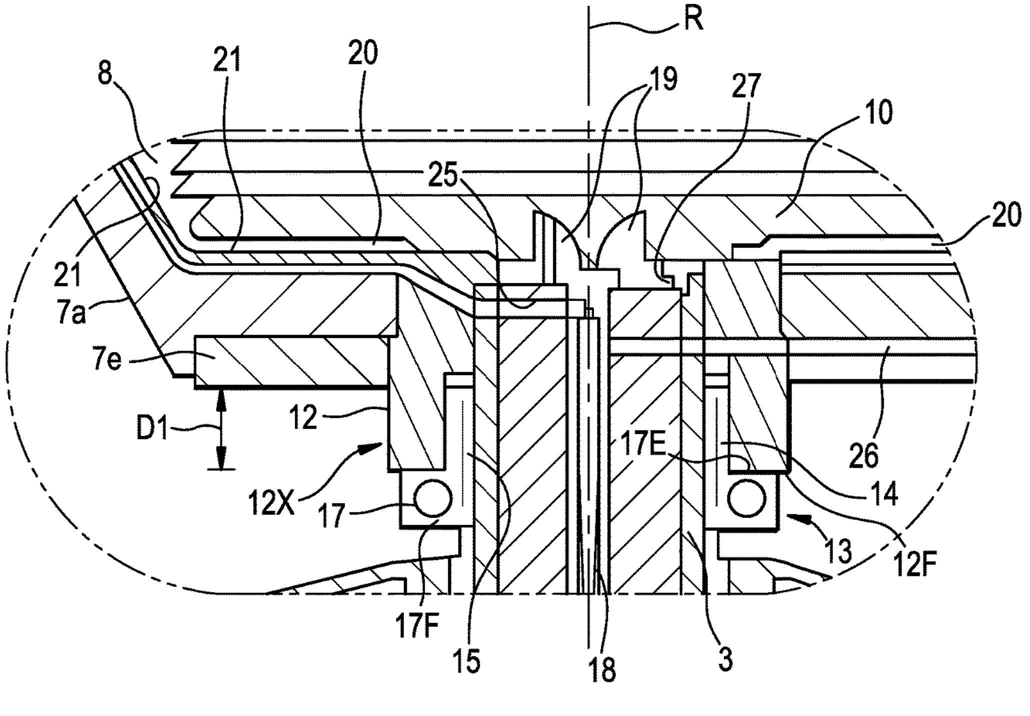
FIG. 3 is an enlarged of detail 3-3 of FIG. 1.

The rotor 2 comprises a hub 12 situated on the outside of the lower part 7*a* of the rotor wall and outside the rotor's inner space. The hub 12 is tubular and extends axially outwards/downwards from the lower part 7*a*, and the tubular hub is configured to radially surround a portion of the rotor shaft 3. Both the tubular hub 12 and the rotor shaft 3 are cylindrical with circular cross-sections. A releasable clamping device 13 is arranged to connect the hub 12 to said portion of the rotor shaft 3 in a frictional fastening. The clamping device 13 is fitted in (e.g., slid axially into) an annular space which is arranged radially between the hub 12 and the rotor shaft 3. The clamping device 13 has a flange 17F that has an outer sleeve 14 and an inner sleeve 15 extending axially therefrom. The outer sleeve 14 is expandable radially outwards and configured for frictional engagement with the hub 12, and the inner sleeve 15 is expandable radially inwards and configured for frictional engagement with the rotor shaft 3. An annular gap 16 extends axially between the outer sleeve 14 and the inner sleeve 15, and a pressurizing screw 17 is provided for pressurization of a pressure medium in the gap 16 in order to expand the outer sleeve 14 and the inner sleeve 15 to a state in which they lock the hub 12 and the rotor shaft 3. The pressurizing screw 17 may be slackened to reduce the pressure on the pressure medium so that the expandable sleeves 14, 15 revert to their original shape and the fastening is thus undone so that the clamping device 13 the rotor shaft 3 and the rotor 2 are released from one another without axially separating the rotor shaft 3 from the rotor 2, as shown in FIG. 1. As shown in FIG. 3, the hub 12 extends axially downward from the planar wall portion 7*e* a distance D1 sufficient to receive the inner sleeve 15 and the outer sleeve 14. The hub 12 terminates at an unobstructed axial end 12F that engages a portion 17E of the flange 17F of the clamping device 17. The hub 12 has an unobstructed radially outward surfaces 12X configured to provide access to the clamping device 17 whereby the clamping device 12 is operable from the outside of the rotor 2 in order to releasably connect the hub 12 to the rotor shaft 3.

The centrifugal separator in FIG. 1 has an inlet comprising a duct 18 which extends axially through the rotor shaft 3, and the rotor 2 has a connection 19 for the duct 18. The connection 19 is disposed within the hub 12 and arranged to communicate with the separating chamber 8 via a number of liquid passages in the form of distribution ducts 20 which extend straight outwards radially from the connection 19 and lead into the separating chamber 8. The distribution ducts 20 are disposed at equal spacing in the circumferential direction within the rotor 2. The distribution ducts 20 form an angle of 90° with the axis of rotation R. Consequently, the connection 19 within the hub 12 is arranged to change the direction of flow by 90° from the duct 18 to the distribution ducts 20 which are adapted to leading the flow straight outwards in a radial direction to the separating chamber 8. The lower part 7*a* of the rotor shown has a radially inner planar wall portion and a radially outer sloping and surrounding wall portion. The distribution ducts 20 are disposed along the underside of the compressible unit 10 which comprises the separating discs 11. The distribution ducts 20 thus lead into the separating chamber 8 at the lower portion of the compressible unit 10, and the direction of the liquid mixture is again changed by about 90° (relative to the direction in the distribution ducts) upwards in the separating chamber 8 containing the stack of separating discs 11.

An elastic sliding element 21 is provided within the rotor 2 to open and close a number of outlet apertures 22 which are disposed peripherally in the lower part 7*a* of the rotor wall. The elastic sliding element 21 is also described in specification WO 96/41683 A1. The sliding element 21 has a radially inner edge 23 connected to, and axially fixed relative to, the rotor 2, and a radially outer edge portion 24 which is axially movable relative to the rotor 2 between open and closed states of the outlet aperture 22 by elastic deformation of the sliding element 21. The elastic sliding element 21 is deformed (operated) by feeding a hydraulic liquid in/out to fill/empty a closing chamber disposed between the sliding element 21 and the lower part 7*a* of the rotor wall. The rotor shaft 3 shown encloses a duct 25 for supply to the closing chamber of a liquid which by centrifugal force and consequent hydraulic pressure pushes the underside of the elastic sliding element 21 to a closed state of the outlet aperture 22. The rotor shaft 3 encloses also a duct 26 for supply of liquid to open a discharge valve through which the liquid of the closing chamber is drained. Emptying the closing chamber of liquid reduces the hydraulic pressure from the underside of the sliding element 21, with the result that the sliding element is deformed elastically so that its radially outer edge portion 24 moves axially downwards and opens the outlet aperture 22. Such a procedure of opening the outlet apertures 22 is conducted in situations where the rotor 2 needs to be emptied of the sludge which accumulates over time in the radially outer portions of the separating chamber 8. Such a sliding element is particularly applicable to the present invention, since the elastic sliding element 21 needs no axial support within the rotor 2. In the case of a conventional sliding element (which is not elastically deformed) the hub which extends axially inwards in the rotor is used to support an inner edge of the sliding element which is arranged to move axially upwards/downwards on the hub during closing/opening of the outlet apertures 22.

The hub 12 comprises an axial stop 27 for the rotor shaft 3 in the form of an annular abutment surface extending radially inwards and arranged to abut against the rotor shaft's free end within the hub. This is a simple way to ensure correct axial positioning of the rotor shaft 3 relative to the hub 12. The hub 12 comprises also an axial stop 28 for the clamping device 13, in the form of a similar abutment surface extending radially and configured to abut against an end of the clamping device 13, which end is within the hub 12. Correct axial positioning of the clamping device 13 relative to the hub 12 is thus ensured.

An outlet chamber 29 for a separated liquid component is provided in the upper portion of the compressible unit 10. The outlet chamber 29 communicates with the separating chamber 8 via outlet passages (not shown). The centrifugal separator 1 also comprises members (not shown) for discharging the liquid component out from the outlet chamber 29 and the rotor 2.

Figure 2:
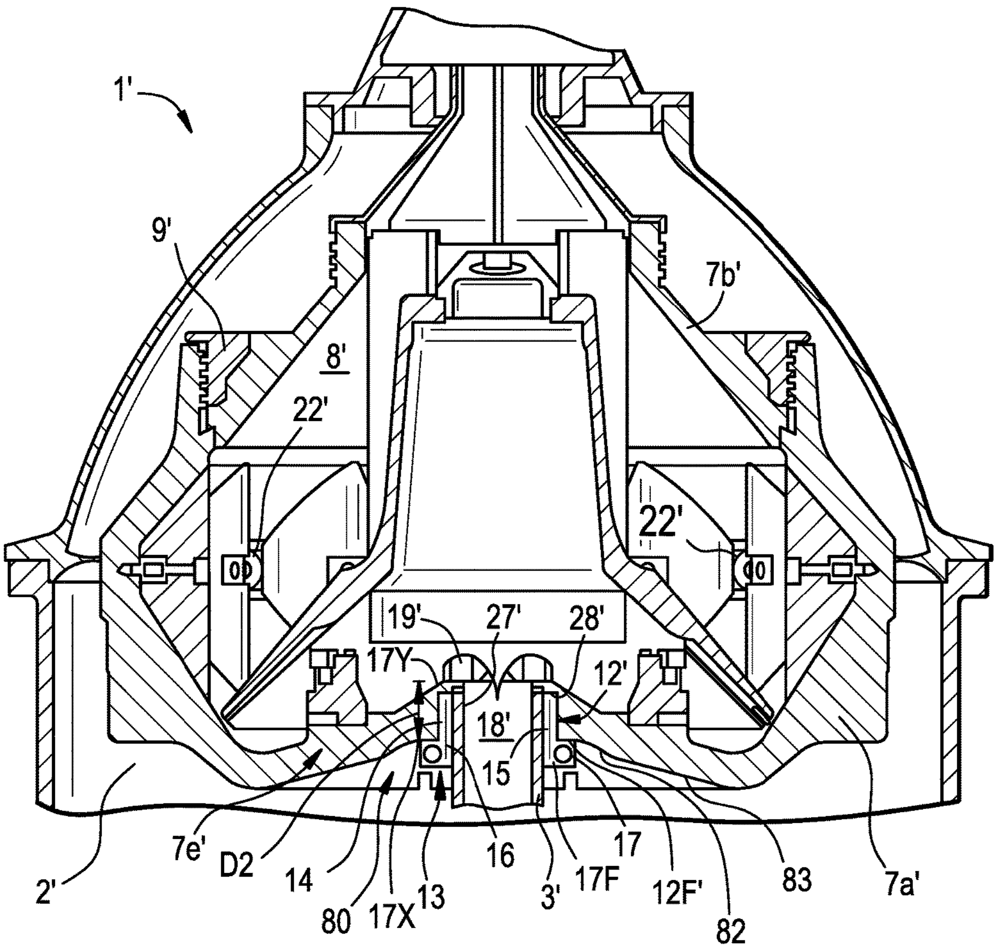
FIG. 2 shows a centrifugal separator according to a second embodiment of the invention.

FIG. 2 shows a centrifugal separator 1' according to a second embodiment of the invention. It should be noted that constituent parts which have the same or similar functions are designated by the same reference signs in both embodiments. This centrifugal separator 1' differs from the centrifugal separator according to FIG. 1 inter alia in the configuration of the hub 12'. This hub 12' takes the form of a recess in the lower part 7*a*' of the rotor wall. A portion 7*e*' of the lower part 7*a*' is positioned on a bottom portion of the rotor 2'. The portion 7*e*' of the lower part 7*a*' has an inside surface 17Y and an outside surface 17X spaced apart from one another by a predetermined distance D2. The recess is formed in a relatively thick rotor wall 7*a*'. The recess 12' may therefore be made deep enough, with no need for the hub to extend axially inwards in the rotor 2'. The recess 12' is configured to radially surround a portion of the rotor shaft 3', and a clamping device 13 is provided to connect the hub to said portion of the rotor shaft 3'. This involves the clamping device 13 being fitted in an annular space arranged radially between the hub 12' and the rotor shaft 3'. The clamping device 13 has in this embodiment the same configuration as in FIG. 1. The predetermined distance D2 is of a magnitude sufficient to receive the inner sleeve 15 and the outer sleeve 14, such that the outside surface 17X defines an unobstructed axial end 12F' that engages a portion of the flange 17F of the clamping device 13 and the outside surface 17X configures (e.g., slopes away from the recess as illustrated by sloped surfaces 82 and 83) an unobstructed area 80 to provide access to the clamping device 13 whereby the clamping device 13 is operable from the outside of the rotor 2' in order to releasably connect the hub 12' to the rotor shaft 3'.

This centrifugal separator 1' differs also in that the rotor 2' has outlet apertures in the form of nozzles 22' disposed peripherally in the rotor wall 7*a*'. Such nozzles 22' are adapted to continuous discharge of separated solid particles (sludge) from the separating chamber 8'. Such a rotor 2' is used in separation of liquid mixtures with relatively high concentrations of solid particles (sludge), viz. from about 6% to 25-30% (by volume). This rotor 2' thus has nozzles 22' arranged to be constantly open, with consequently no need for a discharge system with closing chamber and sliding element (such as shown in FIG. 1). Nor is there any need for a duct to supply a hydraulic liquid to a closing chamber, or for a duct to supply a liquid to a discharge valve in order to empty the closing chamber of its liquid.

As shown in FIG. 2, the centrifugal separator 1' however comprises a similar inlet for the liquid mixture, in the form of a duct 18' extending axially through the rotor shaft 3' with a similar connection 19' for the duct 18' within the hub 12'. In this embodiment example, the connection 19' is likewise arranged to communicate with the separating chamber 8' via a number of liquid passages in the form of distribution ducts (not shown) which extend outwards radially from the connection 19' and lead into the separating chamber 8'. These distribution ducts are likewise disposed at equal spacing in the circumferential direction within the lower portion of the separating chamber 8' and extend in principle straight radially outwards from the connection 19'. However, the lower part 7*a*' of the rotor shown slopes somewhat downwards in a radially outward direction, and the distribution ducts do in principle follow this slope or angle relative to the axis of rotation R. As shown in FIG. 2, the change of direction is about 100°. These distribution ducts lead into the lower portion of the separating chamber 8', and the liquid mixture again changes direction by about 100° (relative to the direction in the distribution ducts) upwards in the separating chamber 8'. This separating chamber 8' is likewise provided with a stack of separating discs (not shown in FIG. 2).

The hub 12' shown in FIG. 2 comprises likewise an axial stop 27' for the rotor shaft 3' in the form of an abutment surface with a radial extent, arranged to abut against the rotor shaft's free end within the hub 12'. The hub 12' likewise comprises an axial stop 28' for the clamping device 13, in the form of an abutment surface extending radially inwards and configured to abut against an end of the clamping device 13, which end is within the hub 12'. In this embodiment example, the respective axial stops 27' and 28' for the rotor shaft 3' and for the clamping device 13 constitute a single radial surface.

The invention is not limited to the embodiment examples described but may be varied and modified within the scope of the claims set out below. According to a further embodiment, the hub may for example take the form of a shaft journal which extends radially outwards from the rotor wall. The shaft journal and the rotor shaft may therefore be connected together via a fastening which in this case takes the form of a shaft coupling. The centrifugal separator may thus be so arranged that the journal is provided with a first bearing member (e.g. a so-called top bearing for the rotor) mounted on the shaft journal, and the rotor shaft is supported by a second bearing member (e.g. a so-called bottom bearing for the rotor) in a frame. This means that the whole rotor, including the shaft journal with the first bearing member mounted on it, can be fitted in the frame with said rotor shaft and the second bearing member. The shaft journal and the rotor shaft are thereafter aligned and connected together by the shaft coupling, which is thus situated between the first bearing member and the second bearing member.

What is claimed is:

1. A centrifugal separator for separation of at least two components of a fluid mixture which are of different densities, which centrifugal separator comprises:

a rotor rotatable about an axis of rotation and comprising a rotor wall which surrounds an inner space with a separating chamber within the rotor, the rotor wall comprising a lower portion having a planar wall portion positioned on a bottom portion of the rotor, an inlet for feeding the fluid mixture into the rotor's separating chamber, at least one outlet for discharging out from the rotor a component separated from the fluid mixture, a rotor shaft arranged to be connected to a hub on the rotor wall, the rotor being supported via the rotor shaft which is drivably connected to a motor for rotation of the rotor about the axis of rotation; and the hub is situated outside the inner space of the rotor and has for the rotor shaft a connection directed axially outwards from the rotor, with a fastening so arranged at the side of the rotor wall which faces away from the inner space;

said fastening is a clamping device arranged to connect the hub to the rotor shaft in a releasable frictional fastening;

the hub is configured to radially surround a portion of the rotor shaft and an annular space is arranged radially between the hub and the rotor shaft, in which space said clamping device is slid axially into for frictional engagement with the hub and with the rotor shaft in the releasable frictional fastening between the clamping device, the hub and the rotor shaft;

the clamping device comprises a flange having an outer sleeve and an inner sleeve extending axially therefrom, the outer sleeve is expandable radially outwards and configured for frictional engagement with the hub, the inner sleeve is expandable radially inwards and configured for frictional engagement with the rotor shaft to lock the hub to the rotor shaft and the fastening is undone so that the clamping device, the rotor shaft and the rotor are released from one another; and the hub extends axially downward from the planar wall portion a distance sufficient to receive the inner sleeve and the outer sleeve thereby terminating at an unobstructed axial end that engages a portion of the flange of the clamping device and the hub having unobstructed radially outward surfaces configured to provide access to the clamping device whereby the clamping device is operable from the outside of the rotor in order to releasably connect the hub to the rotor shaft.

2. A centrifugal separator according claim 1, in which the rotor shaft and the hub are cylindrical.

3. A centrifugal separator according to claim 1, in which the rotor shaft has running through it at least one axial duct adapted to have fluid flowing through it during operation of the centrifugal separator, and the hub comprises for said duct a duct connection which is arranged to communicate with the separating chamber via at least one fluid passage provided in the rotor.

4. A centrifugal separator according to claim 3, in which said duct together with the duct connection and said fluid passage to the separating chamber form for said fluid a transfer path so configured that the fluid conveyed does not change direction by more than 100° relative to the axis of rotation (R).

5. A centrifugal separator according to claim 1, in which the hub comprises an axial stop for the rotor shaft, in the form of an abutment surface with a radial extent, arranged to abut against the free end of the rotor shaft within the hub.

6. A centrifugal separator according to claim 1, in which the hub comprises an axial stop for the clamping device, in the form of an abutment surface with a radial extent, arranged to abut against an end of the clamping device, which end is within the hub.

7. A centrifugal separator according to claim 1, in which the separating chamber contains a stack of truncated conical separating discs, the hub is situated on an underside of the rotor, and the rotor shaft is oriented vertically and supports uppermost the rotor.

8. A centrifugal separator according to claim 1, in which the rotor comprises outlet apertures peripherally in the rotor wall for discharge of a separated component in the form of sludge from the separating chamber, and an elastic sliding element is provided within the rotor to open and close said outlet apertures, which sliding element has a radially inner edge connected to, and axially fixed relative to, the rotor, and a radially outer edge portion which is axially movable relative to the rotor between open and closed states of the outlet aperture by elastic deformation of the sliding element.

9. A rotor for a centrifugal separator, the rotor comprising a rotor wall surrounding an inner space with a separating chamber within the rotor, the rotor wall comprising a lower portion having a planar wall portion positioned on a bottom portion of the rotor and the rotor comprising a hub arranged to be connected to a rotor shaft which is drivably connected to a motor for rotation of the rotor, wherein the hub is situated outside the inner space of the rotor, has for the rotor shaft a connection directed axially outwards from the rotor and is arranged to be connected with a fastening which is so arranged at the side of the rotor wall which faces away from the inner space;

said fastening is a clamping device arranged to connect the hub to the rotor shaft in a releasable frictional fastening;

the hub is configured to radially surround a portion of the rotor shaft and an annular space is arranged radially between the hub and the rotor shaft, in which space said clamping device is slid axially into for frictional engagement with the hub and with the rotor shaft in the releasable frictional fastening between the clamping device, the hub and the rotor shaft;

the clamping device comprises a flange having an outer sleeve and an inner sleeve extending axially therefrom, the outer sleeve is expandable radially outwards and configured for frictional engagement with the hub, the inner sleeve is expandable radially inwards and configured for frictional engagement with the rotor shaft to lock the hub to the rotor shaft and the fastening is undone so that the clamping device, the rotor shaft and the rotor are released from one another; and the hub extends axially downward from the planar wall portion a distance sufficient to receive the inner sleeve and the outer sleeve thereby terminating at an unobstructed axial end that engages a portion of the flange of the clamping device and the hub having unobstructed radially outward surfaces configured to provide access to the clamping device whereby the clamping device is operable from the outside of the rotor in order to releasably connect the hub to the rotor shaft.

10. A centrifugal separator according to claim 3, in which said duct together with the duct connection and said fluid passage to the separating chamber form for said fluid a transfer path so configured that the fluid conveyed does not change direction by more than 90° relative to the axis of rotation.

11. A centrifugal separator for separation of at least two components of a fluid mixture which are of different densities, which centrifugal separator comprises:

a rotor rotatable about an axis of rotation and comprising a rotor wall which surrounds an inner space with a separating chamber within the rotor, the rotor wall comprising a lower portion positioned on a bottom portion of the rotor, the lower portion having an inside surface and an outside surface spaced apart from one another by a predetermined distance, an inlet for feeding the fluid mixture into the rotor's separating chamber, at least one outlet for discharging out from the rotor a component separated from the fluid mixture, a hub defined by a recess positioned between the inside surface and the outside surface;

a rotor shaft arranged to be connected to the hub, the rotor being supported via the rotor shaft which is drivably connected to a motor for rotation of the rotor about the axis of rotation; and the hub is situated outside the inner space of the rotor and has for the rotor shaft a connection directed axially outwards from the rotor, with a fastening so arranged at the outside surface of the bottom portion of the rotor wall;

said fastening is a clamping device arranged to connect the hub to the rotor shaft in a releasable frictional fastening;

the hub is configured to radially surround a portion of the rotor shaft and an annular space is arranged radially between the hub and the rotor shaft, in which space said clamping device is slid axially into for frictional engagement with the hub and with the rotor shaft in the releasable frictional fastening between the clamping device, the hub and the rotor shaft;

the clamping device comprises a flange having an outer sleeve and an inner sleeve extending axially therefrom, the outer sleeve is expandable radially outwards and configured for frictional engagement with the hub, the inner sleeve is expandable radially inwards and configured for frictional engagement with the rotor shaft to lock the hub to the rotor shaft and the fastening is undone so that the clamping device, the rotor shaft and the rotor are released from one another; and the predetermined distance being of a magnitude sufficient to receive the inner sleeve and the outer sleeve such that the outside surface defines an unobstructed axial end that engages a portion of the flange of the clamping device and the outside surface configuring an unobstructed area to provide access to the clamping device whereby the clamping device is operable from the outside of the rotor in order to releasably connect the hub to the rotor shaft.

* * * * *